Oct. 12, 1971 M. D. BOYANICH 3,611,464
AUTOMOBILE STOPPING DEVICE FOR USE IN A CAR WASH
Filed Sept. 19, 1969 2 Sheets-Sheet 1
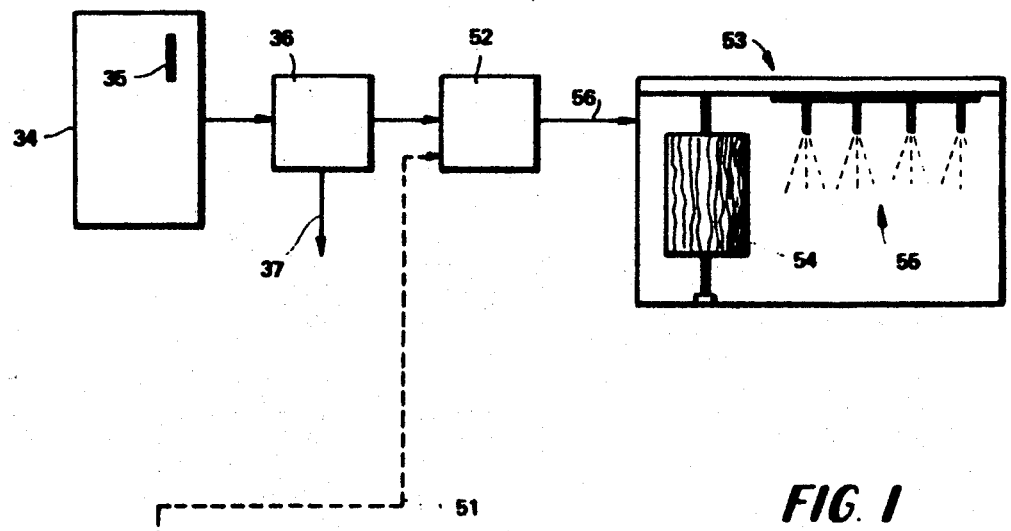
FIG. 1
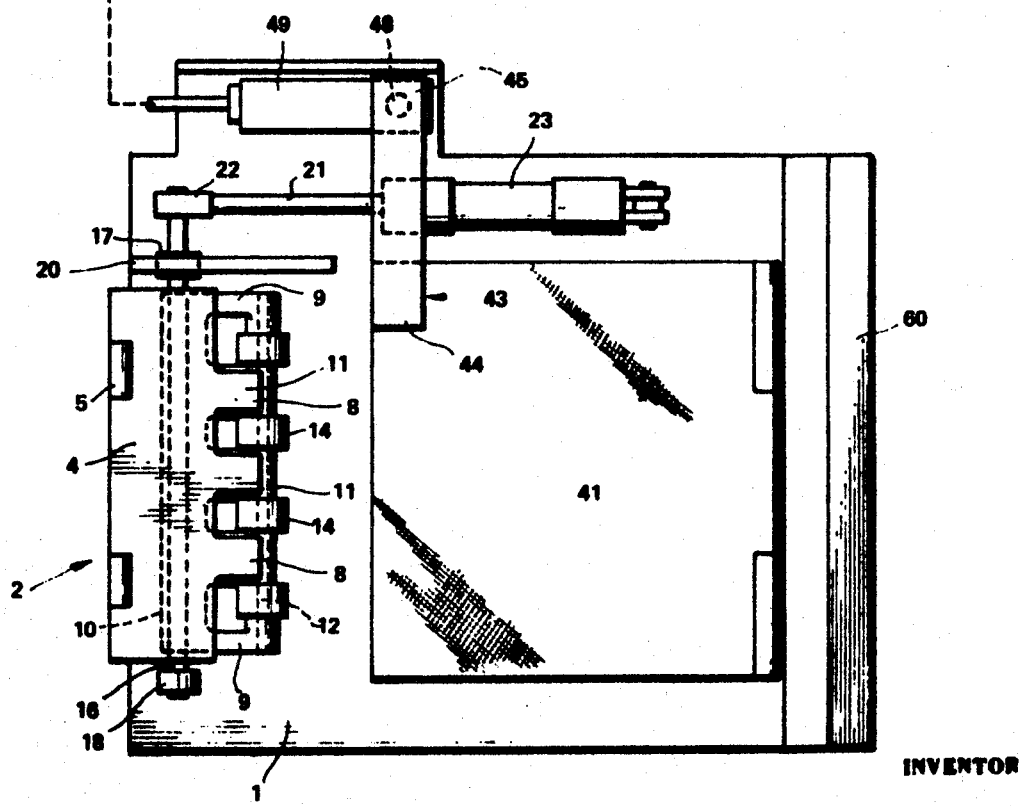
INVENTOR
MILAN D. BOYANICH
BY Abraham A. Saffitz
ATTORNEY INVENTOR
MILAN D. BOYANICH
BY Abraham A. Seffity
ATTORNEY United States Patent Office 3,611,464
Patented Oct. 12, 1971

3,611,464
AUTOMOBILE STOPPING DEVICE FOR USE IN A CAR WASH
Milan D. Boyanich, Amherst, N.Y., assignor to Miton Car Wash Equipment, Inc., Buffalo, N.Y.
Filed Sept. 19, 1969, Ser. No. 859,307
Int. Cl. B60s 3/04
U.S. Cl. 15—21 R
6 Claims

ABSTRACT OF THE DISCLOSURE

A power operated stop means to limit the movement of a vehicle to thereby stop it at a definite location relative to the movable washing apparatus of a vehicle washing installation is provided adjacent the wheel pad which actuates the switch means for initiating the wash cycle. The stop means comprises a pair of pivotally jointed plates, one of which is secured to a base plate and the other of which is secured to a servomotor to be moved thereby for bringing the plates into extended position, to act as a stop for a vehicle wheel, or to a position wherein the plates are folded together to permit passage of the wheel thereover.

---

Figure 2:
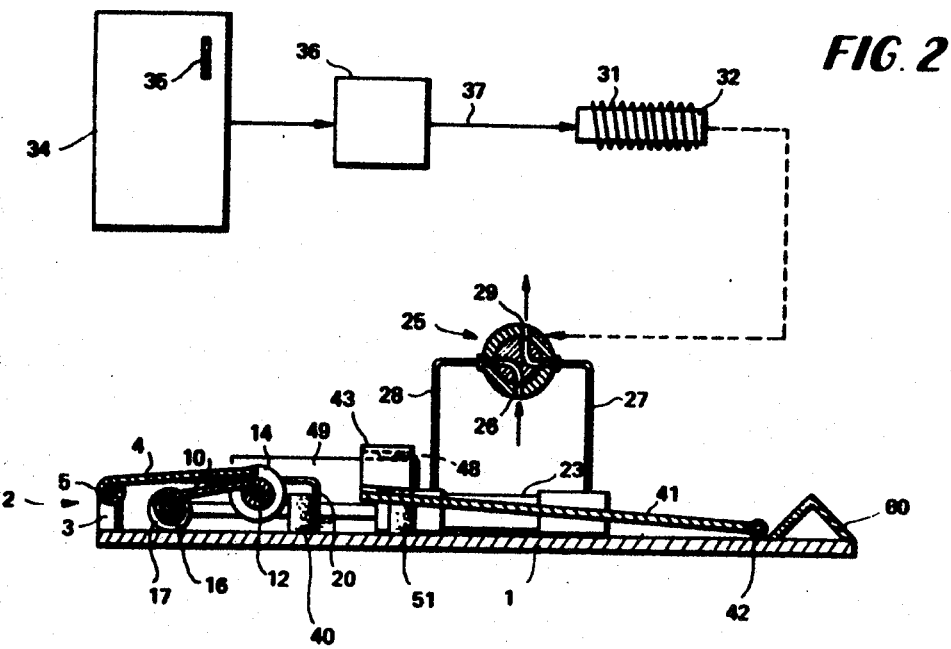

This invention relates to stop means for limiting the movement of the vehicles in car washing apparatus and hold the vehicle in proper relation to the washing apparatus.

This invention particularly deals with vehicle washing installations wherein the vehicle is stationary and the washing equipment is moved relatively to the vehicle in various patterns of motion whereby the moving washing apparatus traverses all parts of the stationary vehicle to perform the washing, brushing, rinsing and other functions of the complete cycle.

In the above washing arrangement, it is important that the vehicle be properly located in relation to the movable washing apparatus. In certain installations, the vehicle is driven in a certain path with the driver visually observing a light until it turns red. He must then stop at that point to properly locate the car. In the installation shown in U.S. Pat. No. 3,315,691, a depression or shallow pit is provided to properly locate the car in relation to the movable washing equipment. In other installations, stop lines are painted on the floor, or shallow stop means are embedded in the floor.

All of the above vehicle-locating means are objectionable in that visual means do not provide the precise vehicle location, and in that pit means cause pools of water. Precise location is necessary because in many automated vehicle washing installations the wheels, or other parts of the vehicle, contact the washing apparatus control means to initiate the washing cycle at the precise time the control means is energized.

An object of this invention is to provide a positive stop means for the vehicle which does not require any visual effort by the driver.

Another object is to provide a stop means which is automatically raised from a collapsed position, generally level with the floor, to an operative position wherein it is contacted by the wheels of the vehicle, or the bumper, or other parts, to hold the vehicle in the proper position relative to the movable washing apparatus.

A further object is to coordinate the position of the stop means and the washing apparatus control means to thereby insure the initiation of the wash cycle as soon as the vehicle is properly located in relation to the washing apparatus.

Further objects and advantages will be apparent from the following description and accompanying drawings.

Figure 3:
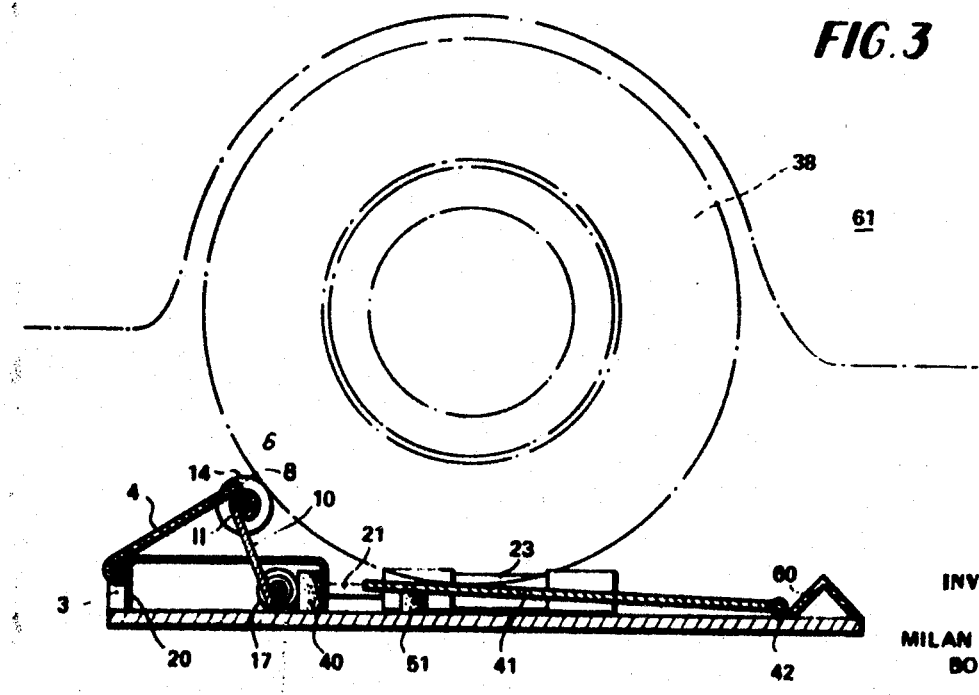

Referring to the drawings:

FIG. 1 is a top view of the stop means and the wheel operated pad means adjacent thereto with a diagrammatic showing of the washing mechanism and its control means interconnected with the stop and pad means;

FIG. 2 is a side view, partly in section, of the stop and pad means in inoperative positions, with a diagrammatic showing of control valve means for the stop means actuating servomotor; and, FIG. 3 is a side view of the arrangement similar to FIG. 2 but with certain parts omitted, disclosing the extension of the stop means to operative position and the pad actuated to operative position by the wheel thereon.

The combined stop and washing apparatus control means may be placed on a single support plate means or on separately related support plates. As shown in FIG. 2, base plate 1 is secured to the floor. Stop means 2 comprises an upright support 3 secured at one end of plate 1. Upper stop plate 4 is pivotally secured to support 3 by a hinge structure 5 formed between it and support 3. Upper stop plate 4 is formed with struck out portions or tongues 8 and two end hinge portions 9. The lower stop plate 10 is formed along one edge with struck out portions which are thereafter curved to form hinge portions 11 which, when the stop means is assembled, are located below and engage tongues 8. A hinge pin 12 passes through aligned hinge portions 9 and 11, whereby plate 10 is pivotally secured to plate 4.

A plurality of rollers 14 are arranged along hinge pin 12 between portions 11, as illustrated in FIG. 1. Rollers 14 are engaged by the wheels of the vehicle when the stop is in extended position, as illustrated in FIG. 3. Preferably, rollers 14 are made of steel, rubber-coated steel, aluminum, vulcanized rubber, hard impact-resistant plastic, or similar materials.

In view of the hinged connections, stop plates 4 and 10 may assume the collapsed or folded position illustrated in FIG. 2, that is, plate 4 overlaying plate 10 and generally parallel to the floor. To extend stop means 2 to its operative vehicle-stopping position, illustrated in FIG. 3, a force is applied to lower plate 10 to move it to a generally perpendicular position, and thereby to raise plate 4 and rollers 14 to the operative position.

The above necessary force may be applied to plate 10 either manually or by power. In an automated vehicle washing installation, automatically controlled power means are preferred. While the power means may be electrical or pressure fluid, a pressure fluid servomotor is illustrated as a preferred power means in the specific embodiment.

The edge of plate 10 opposite to the edge hinged on pin 12 is curved to form a supporting portion for a shaft 16. Rollers 17 and 18 are supported by shaft 16 on opposite sides of plate 10. Roller 17 is constrained to travel in a reciprocatory path by a roller guide and stop means which may assume the form of a U-shaped member 20, with the open ends of the legs secured to plate 1. A piston rod 21 is secured to a coupling member 22 which couples shaft 16 to the piston rod. Piston rod 21 is secured to a piston (not shown) within cylinder 23. The piston, piston rod and cylinder constitute a conventional servomotor which is controlled by valve 25. Valve 25 may be of any well-known form and, merely for illustrative and exemplary purposes only, it is illustrated as a four-way rotary valve, having inlet port 26, cylinder ports connected to pipe means 27 and 28, and exhaust port 29. It is obvious that other forms of valves, such as pistons or poppet types, may be used. If preferred, a three-way valve may be used with a spring return piston.

The valve is electrically controlled and is actuated by a solenoid means represented by coil 31 and armature 32 therein which is connected to the plug of valve 25 to move it to its operative positions.

The solenoid may be controlled in any desired manner but since the vehicle washing installation is automated, a coin responsive means 34 having a coin slot 35 initiates the operation. Coin responsive means 34, upon receipt of the correct amount, energizes a switch means 36 to energize solenoid 31–32 to actuate the valve to the position illustrated in FIG. 2. In that position, pressure fluid from inlet 26 flows into cylinder line 28 and acts on the piston to move it to the right (FIG. 2). Exhaust from the right end of cylinder 23 takes place through pipe 27 and valve outlet 29. Movement of the piston and its piston rod 21 to the right causes rightward movement of shaft 16 and rollers 17 and 18. In view of roller guide 20 and the linear movement of piston rod 21, plate 10 and plate 4 connected thereto are forced into the upwardly extended position illustrated in FIG. 3, whereby the rollers 14 are elevated about six to seven inches above plate 1 to act as a positive stop for vehicle wheel 38. A shock absorber 40, in the form of a rubber block, may be secured to a leg of roller guide 20 so that roller 17 may engage it. The shock absorber acts to absorb the shock of the wheel contacting rollers 14.

To control the washing cycle, a wheel pad 41 is pivotally secured at 42 to base plate 1 adjacent to stop means 2. A Z-shaped member 43 has one end 44 secured to pad 41 and the other end 45 straddles cylinder 23 and overlaps a push button 48, or similar actuator, of a switch 40. Thus, when wheel 38 rides on pad 41, pad 41 is depressed and switch 49 is energized. A ruuber block type shock absorber 51 is located below pad 41 to absorb the wheel shock and limit downward movement of pad 41 and member 43 secured thereto.

Switch 49 is electrically connected by a cable 51 to the movable washing apparatus control means 52. Energization of control means 52 initiates the operation of the washing apparatus designated by character 53. Means 52 and 53 may be any of the commercial and conventional embodiments of these means well-known in the art. Washing apparatus 53 usually comprises a rotary, rug type, brushing means 54 and several nozzle means 55 to dispense pre-wash water, detergent, wash and rinse sprays.

Control means 52 is so interconnected with washing means 53 that, at the end of the washing cycle, the control means are actuated to terminate the cycle. The means is well known in the art and is diagrammatically designated by character 56. Further, at the end of the washing cycle, stop control means 36 is energized to actuate solenoid means 31–32 to shift valve 25 to the extreme position to collapse the stop means 2. This function is carried out by control means 52 electrically, by interconnecting the several switch means in control means 52 and 36 by cable 58.

An angle iron 60 may be secured to base 1 to act as a slow-down and indicating means to the driver that he has almost reached the stop position.

The operation of the stop means in relation to the wash cycle is as follows: The vehicle is driven into the wash bay. The proper amount is inserted in coin means 34–35 which energizes switch means 36 to actuate the valve in the position illustrated in FIG. 2. As explained above, in this position valve 25 admits pressure fluid to cylinder 23 to move the piston, piston rod 21, coupling 22, shaft 16 and rollers 17 and 18 to the right (FIGS. 1 and 2) whereby joined plates 4 and 10 are extended to the vehicle stop position illustrated in FIG. 3.

Vehicle 61 is guided towards pad 11, either visually or by guide means. The bump over angle iron 60 indicates the immediate approach to the stop means and also acts as a positive slow-down or initial stop for the vehicle. When the wheel rolls over angle iron 60 onto pad 41, it will be positively stopped by engagement with rollers 14. The weight of the vehicle on pad 41 depresses it, and push button 48 is actuated through member 43 to energize switch 49. Energization of switch 49 causes operation of control means 52 to initiate the washing cycle of movable washing means 53. Washing means 53 moves in a certain pattern relative to vehicle 61 and washes the same in a predetermined cycle. At the end of the cycle, washing means 53 returns to its initial starting position and through connection 56 deactivates control means 52. The deactivating operation of means 52 simultaneously energizes control means 36, which is electrically connected to controller 52, to reverse valve 25 and move the piston, the piston rod 21, rollers 17 and 18, and shaft 16 to the left (FIGS. 1 and 2). This leftward movement collapses joined plates 4 and 10 from the extended position of FIG. 3 to the folded position of FIG. 2. The washing operation having been terminated, the driver moves the washed vehicle over collapsed plate 4 out of the wash bay.

A rubber shock absorber 63 is located below plate 10 to absorb the shock of the vehicle passing thereover and support the weight of the vehicle.

While only one stop unit is disclosed since one-wheel engagement therewith is ample for most cars, an additional stop means may be provided for the second wheel of the pair. It merely involves the connection of the cylinder pipes of the other unit to pipes 27 and 28 of the first unit.

Means 36 for solenoid 31–32 may also be manually actuated by the serviceman of the vehicle wash installation, thereby bypassing the cam responsive means.

Although a preferred embodiment of the invention has been disclosed for purpose of illustration, it will be evident that various changes and modifications may be made therein without departing from the scope and spirit of the invention.

Having thus disclosed the invention, what is claimed is:

1. In a vehicle washing installation wherein a washing apparatus moves relatively to a stationary vehicle, stop means to positively position the vehicle in relation to the movable washing apparatus, actuating means to move said stop means from a folded position close to the floor to an extended position in the path of a part of the vehicle to be contacted thereby, said stop means comprising upper and lower plates, means for pivotally joining said plates together along a hinge line, means for pivotally securing said upper plate to a fixed support along a line generally parallel to said first hinge line, and means connecting the lower plate to said actuating means.

2. A vehicle washing installation as claimed in claim 1, wherein said actuating means comprises a pressure fluid motor having relatively movable cylinder and piston members, and connecting means between the lower plate and the movable member of the motor.

3. A vehicle washing installation as claimed in claim 2, wherein said connecting means is between the lower plate and the piston member which moves within the cylinder member.

4. A vehicle washing installation as claimed in claim 2, wherein the connecting means comprises a rod connected to the movable member at one end, said rod having a pivotal connection to the lower plate at the other end.

5. A vehicle washing installation as claimed in claim 4, wherein guide means are provided to cause said rod and pivotal connection to move linearly.

6. A vehicle washing installation as claimed in claim 4, wherein said pivotal connection comprises a shaft secured to the lower plate adjacent the edge thereof opposite to the hinge line, roller means on said shaft, and means connecting said shaft, rod and guide means to guide the roller means in a linear path.

References Cited

UNITED STATES PATENTS

| | | | |
|---|---|---|---|
| 3,306,233 | 2/1967 | Saxonmeyer | 104—249 |
| 3,361,143 | 1/1968 | Daum et al. | 134—45 |
| 3,448,717 | 6/1969 | Kuhlman | 134—45 X |

EDWARD L. ROBERTS, Primary Examiner

U.S. Cl. X.R.

188—32